United States Patent [19]
Swanson

[11] 4,038,529
[45] July 26, 1977

[54] SELF LEARNING MONITOR FOR VLF WAVE PROPAGATION

[75] Inventor: Eric R. Swanson, San Diego, Calif.

[73] Assignee: The United States of America as represented by the Secretary of the Navy, Washington, D.C.

[21] Appl. No.: 695,614

[22] Filed: June 14, 1976

[51] Int. Cl.² .......................... G01S 7/44; G06F 15/50
[52] U.S. Cl. .......................... 235/150.27; 235/151.13; 343/5 DP; 343/17.7
[58] Field of Search ............ 235/150.2, 150.26, 150.27, 235/151.3, 151.13, 150.1; 343/5 DP, 17.7, 100 CS, 112 C, 112 R, 114; 340/27 R, 415, 421; 325/41, 42, 65, 184, 323, 324; 328/133, 155; 307/232, 262; 333/17 R

[56] References Cited

U.S. PATENT DOCUMENTS

| | | | |
|---|---|---|---|
| 2,767,914 | 10/1956 | Merrill et al. | 235/151.13 |
| 3,151,237 | 9/1964 | Hrabak | 235/151.13 |
| 3,464,549 | 9/1969 | Armbruster | 235/151.13 X |
| 3,549,875 | 12/1970 | Goldman et al. | 235/151.13 X |
| 3,936,828 | 2/1976 | Muesse et al. | 235/151.27 X |

Primary Examiner—Joseph F. Ruggiero
Attorney, Agent, or Firm—R. S. Sciascia; G. J. Rubens

[57] ABSTRACT

A monitor for notifying a vehicle using VLF navigation of an abnormal condition of VLF wave propagation. Sensing means, including an antenna, oscillator, IF mixer, and phase tracker is provided to periodically sense changes in the phase angle of a VLF wave received by the monitor, and to couple a succession of values of an updating quantity into a data processing means, each value corresponding to a sensed amount of phase change. The data processing means learns what comprises a normal condition of VLF wave propagation by averaging successive values of the updating quantity, and provides notice of an abnormal condition whenever a received value of the updating quantity varies from the previously computed average by an amount in excess of a preselected criterion.

11 Claims, 6 Drawing Figures

SELF LEARNING MONITOR FOR VLF WAVE PROPAGATION

BACKGROUND OF THE INVENTION

The present invention relates to a means and a method for learning to determine whether a condition which is definable in terms of detectable numerical quantities is normal or abnormal, and more particularly, to such means for determining whether the condition for VLF (Very Low Frequency) wave propagation is normal or abnormal.

The use of VLF, or radio waves in the 3-30 kHz range, is finding increasing application in navigation systems. Generally, the VLF a vehicle determines its position at a given time by employing a phase tracker and a reference signal provided by an oscillator to determine the change in phase angle of a VLF signal generated by a radio station, as the vehicle moves from a known location to its location at the given time. A change in phase angle indicates the distance the vehicle has traveled toward or away from the station. By tracking the change in phase angle of the signals from each of two or three or more VLF stations a navigator aboard the vehicle may determine his position.

A propagated VLF wave may be conceptualized as a wave traveling through a spherical waveguide wherein one surface of the waveguide is the surface of the earth and the other surface is the upper limit of the lower ionosphere, or "D" region.

A major source of error in VLF navigation is caused by unpredictable solar disturbances, which may randomly send large numbers of X-rays or protons into the earth's atmosphere, effectively lowering the height of the D region. If the D region is lowered, the propagated VLF wave is traveling through a narrower waveguide so that its velocity must increase, whereby its phase angle is advanced. If a navigator was unaware of the advance in phase angle, he could unknowingly miscalculate his position.

A further error in VLF navigation may result from the unpredictable phenomenon of cycle slippage. Under some conditions for propagation of a VLF wave, one mode of propagation is dominant during the day, whereas a different mode is dominant during the night. During a period, such as during an evening, when the propagated wave is in transition from one dominant mode to the other, cycle slippage may occur wherein the VLF wave is anomalously advanced by an entire cycle. A phase tracker may accurately track the change in phase angle of the VLF wave without being aware of the anomalous cycle advance. Consequently, a position calculated on the basis of the phase angle change could be in error by a distance equal to a wavelength or to a half wavelength of the VLF wave. At 10 kHz this could be as much as sixteen miles when navigating against a reference derived from a precision clock. This distance could be very significant, such as when flying near mountains or in narrow flight lanes.

When solar and atmospheric conditions vary in an unpredictable manner, for example, when solar disturbance or anomalous cycle slippage occurs, the VLF propagation condition may be considered to be abnormal, since an unpredictable navigationally significant variation of the phase angle of the VLF wave may occur. The phase angle is given region may be expected to vary over a period of time, of course, as the solar radiation in the region varies. If the variation of phase angle is cyclical, for example, the variation during a 24 hour diurnal cycle, so that it may be predictable, the VLF propagation condition may be considered to be normal, since the variation in phase angle may be measured and accounted for. Measurements of predictable variations of phase angle, however, may be very tedious, particularly if they require extensive manual observations and calculations at a number of sites.

SUMMARY OF THE INVENTION

The present invention discloses a means for monitoring conditions affecting VLF wave propagation by learning to determine whether the propagation condition is normal or abnormal at a given point in time. The invention provides notice whenever the propagation condition becomes abnormal, for example, as a result of solar disturbance or anomalous cycle slippage. The invention also discloses a method for providing notice when propagation conditions become abnormal.

The invention is provided with sensors to periodically sense the numerical values of one or more quantities which together indicate the propagation condition at the time of sensing. The numerical value of each sensed quantity is averaged by data processing means with all of the previous sensed values of the quantity to obtain an updated average value, which is then stored in a memory means. Over a period of a time the averaging process develops a numerical value for each quantity. Through this process the invention "learns" what comprises a normal condition. Whenever a sensed value of one of the quantities differs from the average value of the quantity the invention provides notice of an abnormal condition.

It may be noted that a device using the self-learning concept and the structure of the disclosed invention could be modified for purposes besides VLF propagation, where it was desired to know whether a condition, definable in terms of detectable numerical quantities, was normal or abnormal. For example, the invention could be modified to sense the number of cars passing a certain point on a freeway during a give time period, on each of a successive number of days, to learn what constituted a normal traffic condition at that point for the time of day. The invention could then provide notice if the traffic condition for that time and place became substantially different.

It may be further noted that the disclosed invention could also be used as part of a system which, in addition to providing notice of an abnormality was detected.

Statement of the Objects of the Invention

An object of the invention is to improve the reliability of a VLF navigation system.

Another object is to provide an improved means for providing notice of an unexpected navigationally significant change in the phase angle of a VLF wave.

Another object is to provide an improved means for detecting a normal or abnormal condition of VLF wave propagation.

Another object is to provide an improved method for detecting a normal or abnormal condition of VLF wave propagation.

Other objects, advantages and novel features of the invention will become apparent from the following detailed description of the invention when considered in conjunction with the accompanying drawings.

BRIEF DESCRIPTION OF THE DRAWINGS

FIG. 3 is a flow diagram illustrating a computation which may be performed by the computer of the embodiment of FIG. 2.

DESCRIPTION OF THE PREFERRED EMBODIMENT

Figure 1:
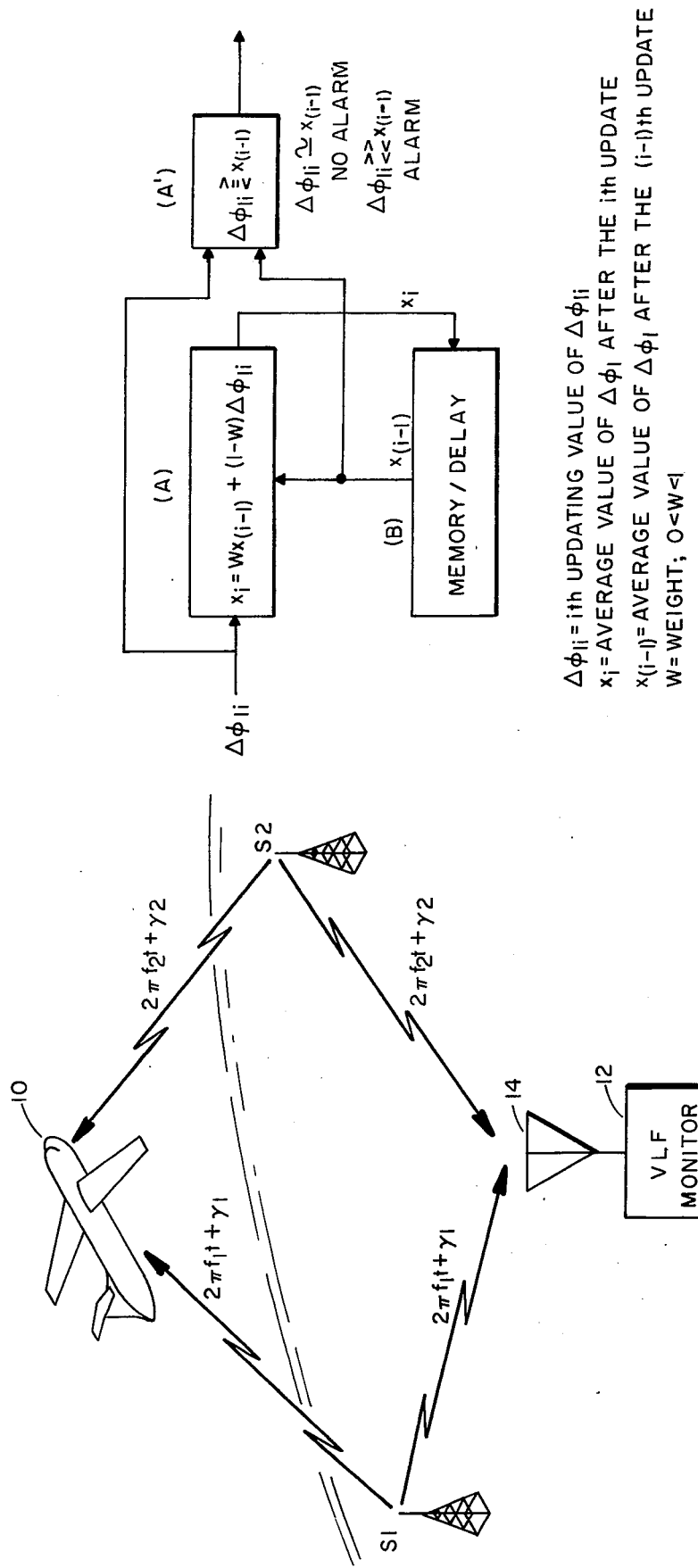
FIG. 1 is a schematic illustration showing an embodiment of the invention located with respect to two sources of VLF waves.

Referring to FIG. 1 there are shown radio stations S1 and S2, wherein station S1 propagates a VLF wave signal of $2\pi f_1 t + \gamma_1$, where $f_1$ may be 20.1 kHz, and station S2 propagates a VLF wave signal of $2\pi f_2 t + \gamma_2$, where $f_2$ may be 24.3 kHz. $\gamma_1$ and $\gamma_2$ are the phase angles of the respective VLF signals sensed by a receiver located at a given position. Aircraft 10 receives VLF signals from stations S1 and S2, and is equipped with VLF navigation equipment to determine its position by calculating the changes in the values of $\gamma_1$ and $\gamma_2$, as it moves from a known location to the position to be calculated, as previously described. However, also as previously described, $\gamma_1$ and $\gamma_2$ may change with respect to a receiver as a result of a change in the VLF propagation condition, as well as from a change in the receiver's location.

Self-learning disturbance monitor 12 is provided with antenna 14 through which it may receive the VLF signals from S1 and S2. The monitor 12 is geographically situated so that any navigationally significant change in $\gamma_1$ or $\gamma_2$ which occurs as a result of solar activity and which occurs within the general region of the flight of aircraft 10 will be sensed by monitor 12.

Figure 2:
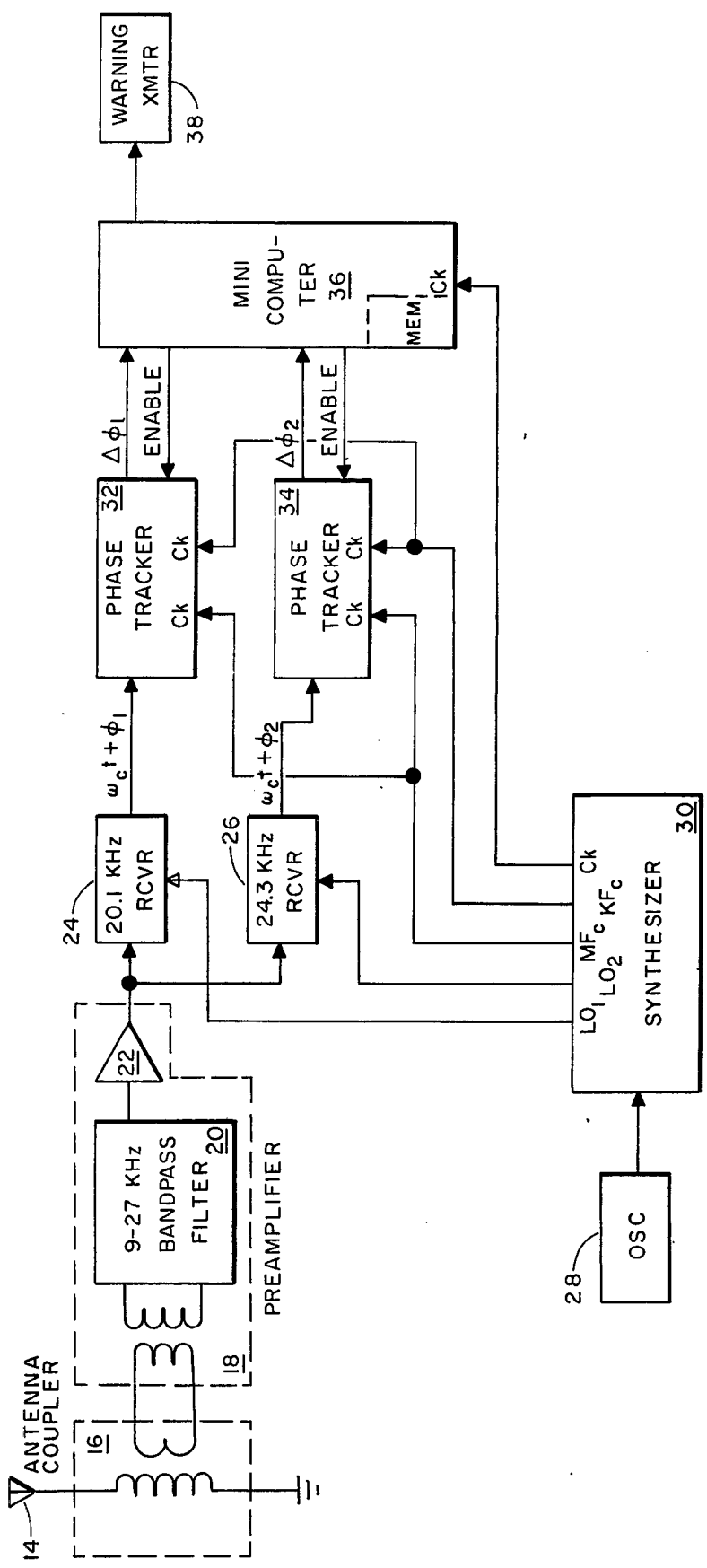
FIG. 2 is a schematic illustration of an embodiment of the invention.

Referring to FIG. 2, there is shown antenna 14 inductively coupled through antenna coupler 16 to preamplifier 18. In the disclosed embodiment antenna 14 may be a simple whip antenna. However, in variations of the invention other types of antennae may be preferable. Preamplifier 18 comprises bandpass filter 20, which passes signals in the VLF range, and amplifier 22, which amplifies the VLF signals coupled into it. The output of amplifier 22 is coupled to the inputs of receivers 24 and 26. Receiver 24 is a radio frequency receiver tuned to receive signals of 20.1 kHz so that it receives the VLF signal propagated by station S1. Similarly receiver 26 is a radio frequency receiver tuned to 24.3 kHz so that it may receive the signal from station S2.

Oscillator 28 provides a signal to synthesizer 30, which generates local socillator outputs LO$_1$ and LO$_2$. LO$_1$ is coupled into receiver 24, where it is mixed with the 20.1 kHz signal from station S1 to produce an IF signal $\omega_c t + \phi_1$, which is coupled into phase tracker 32.

Similarly, synthesizer 30 produces a signal LO$_2$, which is coupled into receiver 26 and mixed with the 24.3 kHz signal from station S2 to produce an IF (Intermediate Frequency) signal $\omega_c t + \phi_2$, which is coupled into phase tracker 34. It may be seen that the quantity $\phi_1$ is a phase angle related to $\gamma_1$ so that if $\gamma_1$ changes, $\phi_1$ changes in a related manner. The quantity $\phi_2$ is similarly related to $\gamma_2$. Phase tracker 32 may comprise a phase locked loop which tracks the phase angle $\phi_1$ of its input signal and responds to any change in $\phi_1$ by generating an output $\Delta\phi_1$, which is equal to the change in $\phi_1$. Consequently, if $\gamma_1$ changes by a value $\Delta\gamma_1$, phase tracker 32 generates a value of $\Delta\phi_1$, where each unique value $\Delta\gamma_1$ generates a unique value of $\Delta\phi_1$. Similarly, phase tracker 34 generates an output $\Delta\phi_2$ having a unique value for every unique value of $\Delta\gamma_2$. Phase trackers 32 and 34 are both clocked by signals MF$_c$ and KF$_c$ which are produced by synthesizer 30, wherein the signal F$_c$ is integrally related to the frequency $\omega_c/2\pi$.

A suitable component for use in each of the phase trackers 32 and 34 may comprise the Cox Digital Phase Lock Loop (DPLL) disclosed in "A New Integrated-Circuit Digital Phase-Locked Loop" by William H. Lee, Captain Edwin V. Harrington, Jr., and Duncan B. Cox, Jr., P-148, the Charles Stark Draper Laboratory, Inc., Cambridge, Massachusetts 02139, the draft of a presentation to the National Aerospace and Electronics Conference, Dayton, Ohio, June 1975. When the Cox DPLL is in its stable condition the phase angle $\phi_i$ of its input signal is equal to the phase angle $\phi_L$ of a signal circulating through a closed loop within the DPLL. If $\phi_i$ changes by an amount $\Delta\phi_I$ changes by an amount $\Delta\phi_I$, so that $\phi_i \neq \phi_L$, the DPLL generates N successive incremental or decremental phase changes $\Delta\phi$ which are fed into the loop, causing $\phi_L$ to move in the direction of the change of $\phi_I$ until $\phi_I$ and $\phi_L$ are again equal. It may be seen that $\Delta\phi_I$, the change in $\phi_I$, is equal to $N\Delta\phi$ so that $\Delta\phi_I$ may be calculated by coupling each of the phase changes $\Delta\phi$ out of the DPLL and adding them. It follows that a suitable device for phase tracker 32 may comprise a Cox DPLL, which receives an input $\omega_c t + \phi_1$ from receiver 24 whenever it is enabled by a signal from mini computer 36, and an adding means receiving the incremental or decremental changes $\Delta\phi$ from the Cox DPLL to provide $\Delta\phi_1$ to mini computer 36. Phase tracker 34 may comprise a similar combination to provide $\Delta\phi_2$ to mini computer 36. As previously described, the values $\Delta\phi_1$ and $\Delta\phi_2$ correspond to changes of $\gamma_1$ and $\gamma_2$, respectively, which are subject to change as solar and atmospheric conditions vary. also as previously described, some of these variances are repetitive and consequently may be predictable, whereupon the VLF propagation condition may be considered to be normal, since their effects on VLF propagation will be known. Other solar and atmospheric variances, however, for example, the variations resulting from solar disturbances or cycle slippage do not occur in any kind of predictable pattern, but may generate navigationally significant changes of $\gamma_1$ or $\gamma_2$. To provide notification that an unpredictable variation of solar or atmospheric condition has occurred, whereby a navigator could be informed of a possible error in his calculations, mini computer 36 may be set up to learn what constitutes a normal condition of VLF propagation. Over time, monitor 12 senses successive values of $\Delta\gamma_1$ and $\Delta\gamma_2$ and couples into computer 36 successive corresponding values of $\Delta\phi_1$ and $\Delta\phi_2$, each new value of $\Delta\phi_1$ and $\Delta\phi_2$ comprising an updating value. Each updating value is averaged with all previous values of $\Delta\phi_1$ or $\Delta\phi_2$, respectively, to obtain an updated average, which is then stored in the computer memory. When a sufficient number of values of $\Delta\phi_1$ and $\Delta\phi_2$ have been coupled into computer 36, the updated averages will account for the usually occurring variations of $\gamma_1$ and $\gamma_2$, whatever the range of variations may be. Consequently if $\gamma_1$ or $\gamma_2$ changes by an abnormal amount, an updating value of $\Delta\phi_1$ or $\Delta\phi_2$ is generated and coupled into computer 36 which varies from its respective previously calculated average in excess of a preselected criterion. The computer responds to such a abnormal value of $\Delta\phi_1$ or $\Delta\phi_2$ sending an alarm signal to warning transmitting 38 whereupon transmitter 38 provides notice of an abnormal VLF condition to aircraft 10.

The learning process of the monitor of the disclosed embodiment may be illustrated by considering the 24 hour diurnal cycle. During each diurnal cycle solar and atmospheric conditions in the region of the monitor may be expected to continually change, since solar radiation is continually changing,. To determine whether the VLF condition is normal in the region of the monitor at a given time, $\Delta\gamma_1$ and $\Delta\gamma_2$ may be sensed at k intervals during each of m diurnal cycles by monitor 12, generating n updating values $\Delta\phi_1$ and $\Delta\phi_{2i}$, where $n = km$. From the n values computer 36 may calculate what comprises average, or normal, values of $\Delta\phi_1$ and $\Delta\phi_2$ and thereby become responsive to the occurrence of an abnormal value of $\Delta\gamma_1$ or $\Delta\gamma_2$ during a diurnal cycle.

FIG. 3 illustrates the operation of mini computer 36 in performing the two functions of (1) averaging successive updating values of $\Delta\phi_1$ to obtain an average value of the quantity $\Delta\phi_1$, and (2) of comparing each value $\Delta\phi_{1i}$ with the previous average where $\Delta\phi_{1i}$ is the $i^{th}$ updating value of $\Delta\phi_1$. In FIG. 3 $x_i$ is the average value of $\Delta\phi_1$ stored in the memory after the $i^{th}$ updating by $\Delta\phi_{1i}$, $x(i-1)$ is the average value of $\Delta\phi_1$ after the $(i-1)^{th}$ updating by $\Delta\phi_1(i_{-1})$, and W is a weight, $0 < W < 1$. in (A), an updating quantity $\Delta\phi_{1i}$ is coupled into computer 36 to obtain $x_i$, according to the equation $x_i = wx(i_{-1}) + (1-W)\Delta\phi_{1i}$. Simultaneously, in (A') $\Delta\phi_{1i}$ is compared with $x(i_{-1})$ to determine whether $\Delta\phi_{1i}$ is near $x(i_{-1})$. Computer 36 will signal the warning transmitter 38 if and only if $|\Delta\phi_{1i} - x(i_{-1})| > E$ where E is any fixed criterion.

In (B) the computed value $x_i$ is coupled into the computer memory which is provided with a delay to prevent $x_i$ from being coupled into the memory before $x(i_{-1})$ has been coupled out.

In addition to computing and storing average values $\Delta\phi_1$, mini computer 36 may be set up to compute and store average values $\Delta\phi_p$ from a succession of values $\Delta\phi_{pi}$, where $\Delta\phi p$ is a quantity corresponding to change in phase angle of a VLF signal received by monitor 12 from station SP.

In a modification of the invention, in addition to computing the values $x_i$ the computer 36 may be set up to compute values $y_i$ where each $y_i$ is an updated variance estimate $y_i = Wy(i_{-1}) + (1-W)(\Delta\phi_{1i} - x_i)^2$, $y(i_{-1})$ being the input variance estimate. In this modification, instead of providing the computer with a fixed criterion E against which the absolute value $|\Delta\phi 1i - x(i_{-1})|$ is compared, a variable criterion is provided. In this modification computer 36 will signal warning transmitter 38 if and only if the absolute value $|\phi_{1i} - x(i_{-1})|$ is more than the quantity $N^2\sqrt{y_i}$. In the case where a fixed criterion E is used an alarm is provided whenever any excessive variation of $\Delta\phi_{1i}$ occurs. In the case where a variable criterion N is used, N specifies a percentage of excessive variations of $\Delta\phi_{1i}$ which will be allowed to occur before a warning signal is transmitted.

In another modification of the invention, to expand the region within which the monitor may detect an abnormal VLF propagation condition, sensing sites may be placed at a plurality of selected locations, each sensing site being provided with an antenna 14 and preamplifier 18 to sense and couple back to computer site 36 values of $\Delta\phi_{pi}$ in the vicinity of the site location.

In a further modification of the invention mini computer 36 may be set up to receive information from an external source indicating the occurrence of a particular solar or atmospheric phenomenon. The computer could then learn what comprises normal values $\Delta\phi_p$ whenever the phenomenon occurs.

Obviously many modifications and variations of the present invention are possible in the light of the above teachings. It is therefore to be understood that within the scope of the appended claims the invention may be practiced otherwise than as specifically described.

What is claimed is:

1. An apparatus for providing notice whenever a condition of VLF wave propagation becomes abnormal, wherein said condition is normal only when a detectable numerical quantity has a value within an unspecified range of values, said apparatus comprising:
  a. sensing means for sensing the value of said detectable quantity at successive points in time and for generating an updating quantity wherein a unique value of said updating quantity is generated for each different sensed value of said detectable quantity, said detectable quantity comprising the change in phase angle of a VLF wave sensed at each of said successive points in time;
  b. data processing means receiving each generated value of said updating quantity for computing an average value of said updating quantity and for providing an abnormal condition notification signal whenever the absolute difference between a given received value of said updating quantity and the average value computed from selected previously received values of the updating quantity exceeds a preselected criterion.

2. An apparatus for providing notice whenever a condition of VLF wave propagation becomes abnormal, said apparatus comprising:
  a. an antenna means for receiving VLF wave signals;
  b. preamplifier means coupled to said antenna means for amplifying each of said received VLF signals;
  c. radio receiver means coupled to said preamplifier means for generating an IF signal corresponding to each of said received VLF signals;
  d. oscillator means providing signals of fixed frequency to said radio receiver means;
  e. phase tracker means receiving each of said IF signals for tracking changes in phase angle of each of said IF signals and for generating updating values;
  f. computing means coupled to said phase tracker means for computing average values of selected updating values generated up to a given time, and for providing an abnormal VLF notification signal whenever the absolute difference between an updating value generated after said given time and one of said average values exceeds a given criterion.

3. The apparatus of claim 2 wherein said computing means comprises a data processing means.

4. The apparatus of claim 3 which includes a warning transmitter coupled to said computing means for transmitting a warning signal whenever said computing means generates an abnormal condition notification signal.

5. The apparatus of claim 4 wherein one of said antenna means and one of said preamplifier means may be geographically separated from another one of said antenna means and another one of said preamplifier means.

6. The apparatus of claim 5 wherein each of said radio receiver means may comprise a radio receiver tuned to the frequency of a selected propagated VLF wave.

7. The apparatus of claim 6 wherein each of said phase tracker means may comprise a digital phase locked loop and an adding means.

8. The apparatus of claim 7 wherein said preselected criterion may comprise a fixed criterion.

9. The apparatus of claim 7 wherein said preselected criterion may comprise a variable criterion.

10. A method for providing notice that a condition of VLF wave propagation has become abnormal, said method comprising:
   a. the step of sensing the value of change of phase angle of a propagated VLF wave at successive points in time;
   b. the step of generating successive values of an updating quantity wherein a unique value of said updating quantity is generated for each different sensed value of said detectable quantity;
   c. the step of computing an average value of said updating quantity from selected generated values of said updating quantity;
   d. the step of comprising the absolute difference between a given generated value of said updating quantity and the average value computed from selected previously generated values of the updating quantity with a preselected criterion;
   e. the step of generating an abnormal condition notification signal whenever said absolute difference exceeds said preselected criterion.

11. The method of claim 10 wherein a data processing means is used for said computing step and for said comparing step.

* * * * *

UNITED STATES PATENT AND TRADEMARK OFFICE
CERTIFICATE OF CORRECTION

PATENT NO. : 4,038,529
DATED : July 26, 1977
INVENTOR(S) : Eric R. Swanson

It is certified that error appears in the above-identified patent and that said Letters Patent are hereby corrected as shown below:

Column 1, line 15, change "the" to -- in --;

line 66, change "is" to -- in a --;

Column 2, lines 48-50, the paragraph should read --

It may be further noted that the disclosed invention could also be used as part of a system which, in addition to providing notice of an abnormal condition, was designed to take corrective action whenever an abnormality was detected. --

Column 3, line 52, change "socillator" to -- oscillator --;

Column 5, line 25, "$\Delta\phi_{1i}$, x(i-1)" should read -- $\Delta\phi_{1i}$, $x_{(i-1)}$ --;

line 26, "$\Delta\phi_1(i\_1)$" should read -- $\Delta\phi_{1(i-1)}$ --;

UNITED STATES PATENT AND TRADEMARK OFFICE
CERTIFICATE OF CORRECTION

PATENT NO. : 4,038,529
DATED : July 26, 1977
INVENTOR(S) : Eric R. Swanson

It is certified that error appears in the above-identified patent and that said Letters Patent are hereby corrected as shown below:

line 28, "$x_i = wx(i\_1)$" should read -- $x_i = wx_{(i-1)}$ --;

line 30, "$x(i\_1)$" both places should read -- $x_{(i-1)}$ --;

line 32, "$|\Delta\phi_{1i} - x(i\_1)|$" should read -- $|\Delta\phi_{1i} - x_{(i-1)}|$ --;

line 37, "$x(i\_1)$" should read -- $x_{(i-1)}$ --;

line 47, "$y(i\_1)$" should read -- $y_{(i-1)}$ -- both places;

line 50, "$|\Delta\phi 1i - x(i\_1)|$" should read -- $|\Delta\phi_{1i} - x_{(i-1)}|$ --;

line 53, "$-x(i-1)|$" should read -- $-x_{(i-1)}|$ --;

Column 6, line 14, "nunerical" should read -- numerical --;

Signed and Sealed this

Twenty-third Day of May 1978

[SEAL]

Attest:

RUTH C. MASON
Attesting Officer

LUTRELLE F. PARKER
Acting Commissioner of Patents and Trademarks